United States Patent [19]

Stultz et al.

[11] Patent Number: 4,868,833
[45] Date of Patent: Sep. 19, 1989

[54] RAMAN CAVITY DUMP LASER

[75] Inventors: Robert D. Stultz, Huntington Beach; Donald E. Narhi, Moorpark, both of Calif.

[73] Assignee: Hughes Aircraft Company, Los Angeles, Calif.

[21] Appl. No.: 83,342

[22] Filed: Aug. 10, 1987

[51] Int. Cl.$^4$ .............................................. H01S 3/10
[52] U.S. Cl. ........................................ 372/11; 372/3; 372/19; 372/23; 372/97
[58] Field of Search .................. 372/3, 11, 19, 23, 97

[56] References Cited

U.S. PATENT DOCUMENTS

| | | | |
|---|---|---|---|
| 4,048,516 | 9/1977 | Ammann | 372/3 |
| 4,327,337 | 4/1982 | Liu | 372/3 |
| 4,523,315 | 6/1985 | Stone | 372/3 |
| 4,538,274 | 8/1985 | George | 372/3 |
| 4,570,081 | 2/1986 | Baldwin | 372/3 |
| 4,575,645 | 3/1986 | Komine | 372/3 |
| 4,599,725 | 7/1986 | George | 372/3 |
| 4,618,783 | 10/1986 | Pradere et al. | 372/3 |
| 4,633,103 | 12/1986 | Hyman et al. | 372/3 |
| 4,717,842 | 1/1988 | Komine | 372/3 |
| 4,751,714 | 6/1988 | Chen | 372/3 |

FOREIGN PATENT DOCUMENTS

86/02784 5/1986 PCT Int'l Appl. .................... 372/3

OTHER PUBLICATIONS

Rougemont et al; "High-Efficiency... Raman Oscillators"; Optics Letters/vol. 9, No. 10, 10/1984, pp. 460-462.

Frey et al; "High Efficiency... Raman Oscillators"; Optics Letters; 08/1983; vol. 8, No. 8, pp. 437-439.

Primary Examiner—William L. Sikes
Assistant Examiner—Xuân Thi Vo
Attorney, Agent, or Firm—W. J. Streeter; M. J. Meltzer

[57] ABSTRACT

A lasing medium (3) and a Raman medium (20) share a common optical cavity. The lasing medium (3) projects laser light into the Raman medium (20) and, when a threshold intensity within the Raman medium is reached, the Raman medium absorbs the laser light and re-radiates coherent light at a shifted frequency. Optical elements within the system provide an optical cavity for the lasing medium and a second cavity for the Raman medium.

10 Claims, 2 Drawing Sheets

RAMAN CAVITY DUMP LASER

BACKGROUND OF THE INVENTION

1. Field of the Invention

The invention concerns lasing systems and, more specifically, a system in which the Q of a resonant cavity is spoiled by the use of the stimulated Raman effect, without using a conventional shutter.

2. Discussion

As shown in FIG. 1, a typical laser includes a lasing medium 3 positioned between two mirrors 6 and 9. The spacing 12 between the mirrors is an integral number of half wave lengths of the laser frequency. That is, distance 12 equals (N) (lambda)/2, where N is an integer and lambda is the wave length. Therefore, mirrors 6 and 9 form a cavity which can support standing waves at the wave length lambda.

Q is a figure of merit which refers to the sharpness of the resonance in the cavity. A technique called Q-switching is frequently used to obtain short, intense bursts of light from the laser cavity.

In Q-switching, a shutter 15 closes and obstructs one of the mirrors, mirror 9 in this case, thereby preventing photons from travelling back and forth between the mirrors. The closed shutter prevents oscillations by reducing (or spoiling) the Q of the cavity. Without oscillation, stimulated emission is inhibited, and increasing population inversion in the lasing medium 3 is promoted. When the shutter 15 is opened, the cavity becomes high-Q, and reflections between mirrors 6 and 9 resume, thereby stimulating emission and allowing a depletion of the population inversion. The depletion is rapid, resulting in a brief, intense pulse of light.

Several types of shutter can be used. Electro-optic, magneto-optic, or acousto-optic modulators can be used, as well as a bleachable dye which becomes transparent in the presence of sufficient photons. Also, a rotating mirror can be used. However, all of these shutters, with the exception of the dye switch, tend to be expensive. As to a dye switch, some environmental conditions can prohibit the use of dye Q-switches.

Researchers have used Raman cells with Q-switching to generate brief light pulses. For example, R. Frey, A. deMartino and F. Pradere, in "High-Efficiency Pulse Compression With Intra-Cavity Raman Oscillators," Optics Letters, Volume 8, Number 8, Page 437, August, 1983, discuss the use of intra-cavity Raman cells to generate short pulses at the first Stokes frequency. In addition, F. deRougemont, Ding Kong Xian, R. Frey, and F. Pradere, in "High Efficiency Pulse Compression With Externally Pumped Intra-Cavity Raman Oscillators", Optics Letters, Volume 9, Number 10, Page 460, October, 1984, discuss the use of a high Q resonator at the first Stokes frequency used to generate short pulses at the second Stokes frequency. However, these researchers all use a conventional Q-switch in their apparatus.

OBJECTS OF THE INVENTION

It is an object of the present invention to provide an improved lasing system.

It is a further object of the present invention to provide a lasing system that produces short light pulses without using a conventional Q-switch.

It is a still further object of the present invention to provide a lasing system that produces light at a frequency which is shifted from the laser frequency.

SUMMARY OF THE INVENTION

In one form of the invention, two reflectors form a resonant cavity. The cavity contains both a lasing medium and a Raman medium. The lasing medium produces laser photons which pass through the Raman medium. When the intensity of laser photons reaches a threshold (which is characteristic of the Raman medium used), the Raman medium absorbs the laser photons, thereby depleting the laser photon population. At this time, the Raman medium re-radiates light, but at frequencies shifted from the laser frequency, termed the Stokes frequencies. Further, the re-radiated light is coherent.

DETAILED DESCRIPTION OF THE INVENTION

Figure 2:
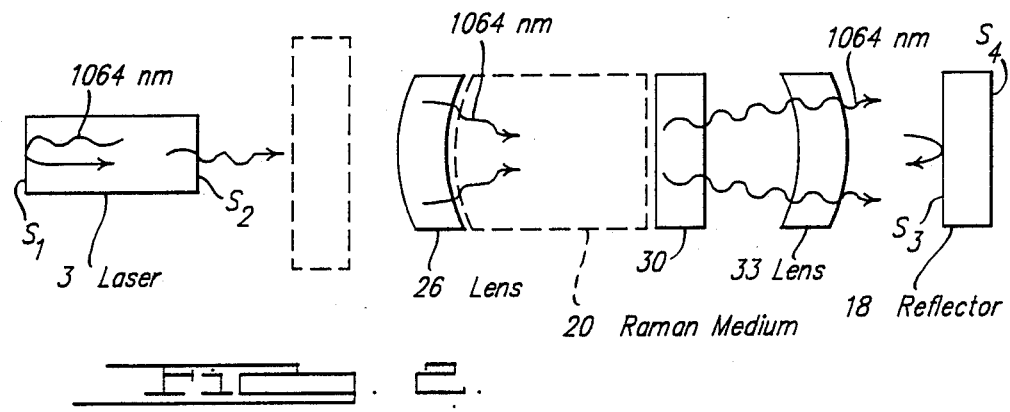
FIG. 2 and 3 illustrate one form of the present invention, but in two different phases of operation.
Figure 3:
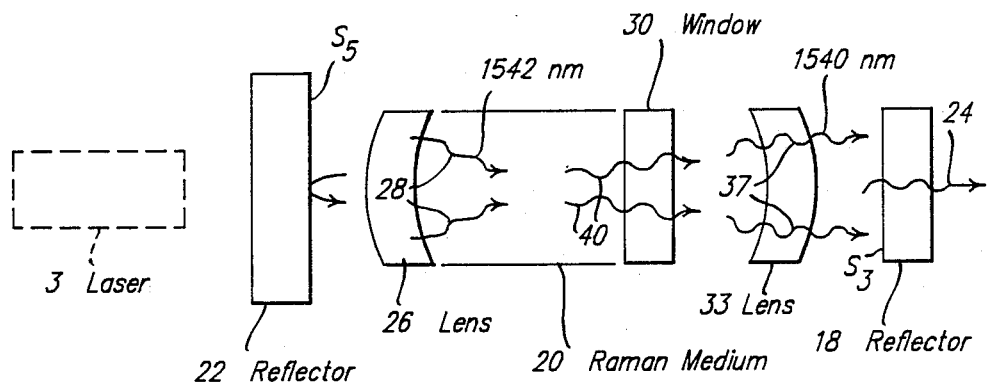

FIG. 2 and 3 illustrate one form of the invention. The components of each figure are identical, but different components are emphasized in each in order to illustrate two different phases of operation of the invention.

In FIG. 2, a laser medium 3, which is a Nd:YAG rod of diameter 4.3 millimeters and length 45 millimeters, is coated on surface $S_1$ for a reflectivity of approximately one hundred percent and coated on surface $S_2$ to be anti-reflective, both coatings effective at 1064 nanometers. Reflector 18 is a BK7 optical flat coated on surface $S_3$ to be approximately one hundred percent reflective at 1064 nanometers. Also, reflector 18 is coated so that its total reflectivity, including those of both surfaces $S_3$ and $S_4$, is approximately twelve percent (or less) at a different wave length namely, 1542 nanometers. The significance of this latter, smaller reflectivity at the longer wave length will be explained later.

The optical distance between surface $S_1$ and surface $S_3$ is 48.7 centimeters. The arrangement just described provides a resonant cavity at 1064 nanometers with surfaces $S_1$ and $S_3$ acting as reflectors, to support lasing of the laser medium 3. This cavity will be termed the $S_1S_3$ cavity.

The lasing medium 3 is pumped with a xenon flash lamp using an LC pulse discharge circuit (lamp and circuit not shown). The value of L is 25 microhenrys and the value of C is 25.3 microfarads.

Upon firing of the flash lamp, the $S_1S_3$ cavity oscillates at 1064 nanometers. However, when the intensity of laser light reaches a threshold, a Raman medium 20 becomes active, as will be explained in connection with FIG. 3.

In that figure, reflector 22, which is a BK7 optical flat coated for reflectivity of about two percent at 1064 nanometers and in excess of ninety-eight percent at 1542 nanometers, cooperates with reflector 18 to provide a low Q-cavity at 1542 nanometers. A surface on reflector 22 is designated $S_5$, so now the low Q-cavity can be termed the $S_3S_5$ cavity. As stated above, the reflectivity of the reflector 18 at 1542 nanometers is less than twelve percent. This causes reflectors 18 and 22 to form a low Q-cavity because most of the photons striking reflector 18 at 1542 nanometers are not reflected, but transmitted as shown by arrow 24.

Contained within this low Q-cavity is a Raman medium in the form of methane ($CH_4$), in a container pressurized at about 69 atmospheres. The left window 26 is a +63 millimeter focal length BK7 meniscus lens which is anti-reflective coated at both 1064 and 1540 nanometers. This meniscus lens 26 serves to focus the incoming laser light in the methane as shown by waves 28. The right window 30 is a BK7 optical flat, anti-reflective coated at both 1064 and 1542 nanometers. A recollimating lens 33 is a +50 millimeter focal length BK7 meniscus lens anti-reflective coated at both 1064 and 1542 nanometers. This latter lens serves to recollimate photons exiting from the Raman cell as shown by waves 37.

When the intensity threshold for the Raman medium 20 is reached, stimulated Raman scattering occurs, resulting in the production of photons 40 at the first Stokes frequency which is a characteristic of the Raman medium. In this case, the wave length is 1542 nanometers, computed as follows. The vibrational frequency for methane is 2914 centimeters $^{-1}$. The laser wave length of 1064 nanometers converts to a frequency of 9399 centimeters $^{-1}$. The difference between these two frequencies, namely, 6485 centimeters $^{-1}$, corresponds to a wave length of the first Stokes line at 1542 nanometers.

Figure 4:
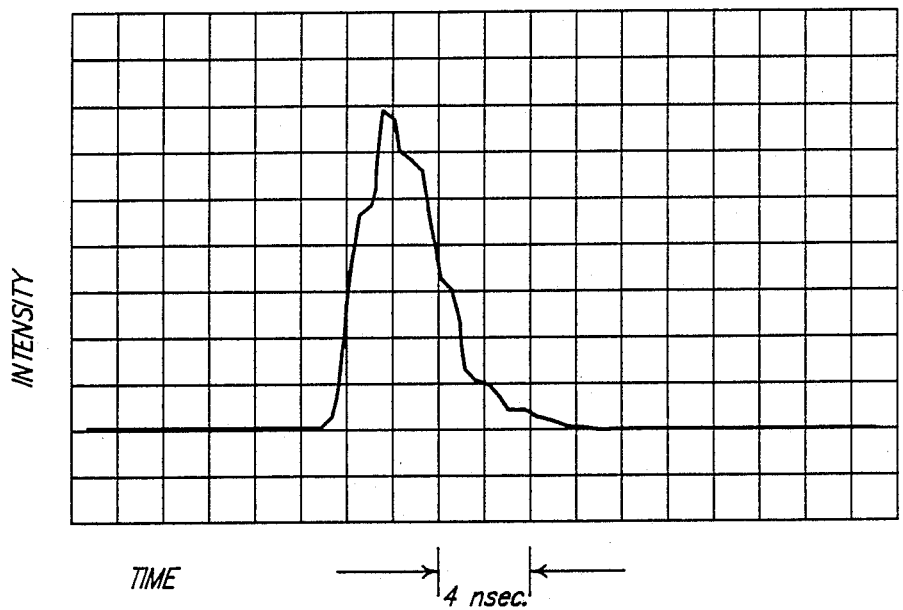
FIG. 4 is a plot of output intensity-versus-time of the invention.

FIG. 4 shows an exemplary oscilloscope trace of the device output. The plot is of intensity-versus-time of radiation at 1542 nanometers. An indium gallium arsenide photodiode detector, together with a storage oscilloscope having a 400 megahertz bandwidth was used to record the pulses. The average output energy was measured to be about two millijoules, using a germanium photodiode detector.

Several important aspects of the invention will now be discussed.

Figure 1:
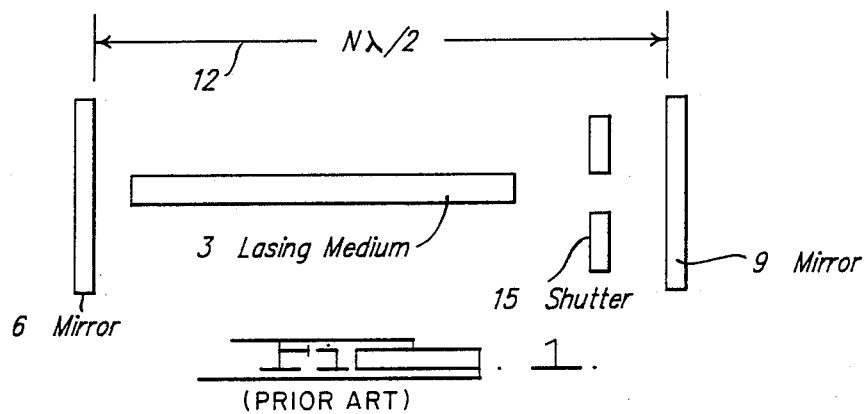
FIG. 1 illustrates a conventional laser.

1. The invention provides high-intensity light pulses without the use of conventional Q-switching as shown in FIG. 1. An energy of about two millijoules was stated above and the pulse duration is approximately 3.5 nanoseconds, as shown in FIG. 4. Further, the output is at a wave length (1542 nanometers) shifted from the primary laser wave length (1064 nanometers).

2. Single pulses were obtained in response to single flashes of the flash lamp, as described in connection with FIG. 4. The inventors believe that it is possible to obtain a train of pulses by substituting a continuous wave (CW) laser for laser 3 in FIGS. 3 and 4. In this case, when the stimulated Raman threshold is reached, the Raman medium 20 will rapidly deplete the laser photon population, and will radiate at the Stokes frequency. Following this, a length of time will be required to restore the laser photon population to the Raman threshold, at which time, absorption will again occur, producing a continuous train of pulses at the first Stokes frequency.

3. The invention, in at least one aspect, operates in a fundamentally different manner than conventional Q-switched lasers. To explain this difference, Q-switching will be explained in an oversimplified manner.

In Q-switching, energy storage occurs in the form of a population inversion of electrons. That is, the electrons are promoted to one (or several) higher energy levels. Then, stimulated emission occurs when the cavity is switched to high Q. However, it is clear that a sufficient population inversion must exist at the time of Q-switching. Restated, the rate of spontaneous transition, or decay of the electrons, must be low enough than a sufficient number remain in the high-energy state at the time of Q-switching.

In the present invention, Stimulated Raman Scattering occurs when the laser photon population (not the population of promoted electrons in the laser medium) exceeds the Raman Threshold. Therefore, lasing media can be used having a faster spontaneous decay rate than the ND:YAG described above. The mechanism of maintaining a population inversion until stimulated emission occurs is not dominant in the invention, as it is in Q-switching.

Viewed another way, in Q-switching, laser output is obtained when the Q of the cavity is high. In the present invention, output is obtained when the Q of the $S_1S_3$ cavity is low.

An invention has been described in which a high Q-cavity (the $S_1S_3$ cavity) contains a low Q-cavity (the $S_3S_5$ cavity). The high Q-cavity is tuned to one wave length, 1064 nanometers, while the low Q-cavity is tuned to a longer wave length, 1542 nanometers. A Raman medium is contained within the low Q-cavity. A laser is contained within the high Q-cavity, and the laser, the high Q-cavity, and the low Q-cavity all share a common optical path.

When the laser is pumped, the high Q-cavity causes the laser photon population to increase. During this increase, the Raman medium is effectively transparent to the laser photon population. However, when the photon population reaches a threshold, the Raman medium absorbs laser photons and re-radiates them at a shifted frequency, according to the Stimulated Raman Effect. The absorption by the Raman medium spoils the Q of the high Q ($S_1S_3$) cavity.

Numerous substitutions and modifications can be undertaken without departing from the true spirit and scope of the present invention as defined in the following claims:

What is claimed is:

1. In a laser which includes a lasing medium within a resonant cavity, the improvement comprising:
   a Q-spoiler provided by a Raman medium which spoils the Q of the resonant cavity by absorbing laser photons when the intensity of laser photons exceeds a threshold.

2. In a laser having a lasing medium contained within an optical cavity, the improvement comprising:
   a Raman medium contained within the cavity which spoils the Q of the optical cavity by absorbing laser photons when the intensity of laser photons exceeds a threshold and reiterate said photons at a shifted frequency.

3. In a laser system, the improvement comprising:
   a laser medium;
   a low Q-cavity having a reflector of low reflectivity at a first frequency, said low Q-cavity being located within a high Q laser cavity in optical alignment with said laser medium;
   a Raman medium contained within the low Q cavity; and
   said laser medium inducing stimulated Raman emission in the Raman medium at the first frequency, and said reflector being located between the Raman medium and laser medium whereupon transmission of light at the first frequency occurs through the reflector.

4. In a laser system comprising:

a laser medium;

a Q-switch including a Raman medium in optical alignment with said laser medium which absorbs photons when the laser photon population reaches a threshold;

an optical cavity which contains both the Raman medium and the laser medium, the Raman medium serving to spoil the Q of the optical cavity; and means for directing photons produced by stimulated Raman emission out of the optical cavity.

5. In an apparatus for obtaining pulsed light from a continuously lasing source, the improvement comprising:

a resonant cavity containing both the lasing source and Raman means for spoiling the Q of the cavity by:
  (i) absorbing laser light only when the laser light exceeds a threshold and
  (ii) radiating light in response to the absorption, but at a different frequency than the laser light and
  (iii) repeating (i) and (ii) to produce pulses at the different frequency.

6. A laser system comprising:

a lasing medium, located within an optical cavity, which provides photons at a first frequency and a Q-switching means including a Raman scattering medium, located within the optical cavity, which
  (i) receives photons from the lasing medium
  (ii) is substantially transparent to the photons when the photon intensity is below a threshold
  (iii) absorbs photons when the photon intensity exceeds the threshold and, in response, radiates photons at a second frequency.

7. In a laser, the improvement comprising the following elements positioned along an optical path in the following sequence:

a first reflector which is reflective at a first frequency;

a lasing medium which provides laser light at the first frequency;

a surface which is substantially transparent at the first frequency;

a second reflector which is
(i) substantially transparent at the first frequency and
(ii) reflective at a second frequency;

a focusing lens for focusing light received from the second reflector;

a Raman medium which
(i) absorbs significant amounts of laser light only when the intensity of the laser light exceeds a threshold, which spoils the Q of the resonant cavity; and (ii) radiates light at the second frequency in response;

a collimating lens for collimating light received from the Raman medium; and a third reflector which is reflective at the first frequency and substantially transparent at the second frequency.

8. In a laser, the improvement comprising the following elements positioned along an optical path in the following sequence:

a first surface ($S_1$) which is reflective at 1064 nanometers, a lasing medium (3) which provides laser light at 1064 nanometers, a second surface ($S_2$) which is substantially transparent at 1064 nanometers, a medium (22) which is reflective at 1542 nanometers and substantially transparent at 1064 nanometers, a focusing lens (26) which is substantially transparent at both 1064 and 1542 nanometers, a Raman cell (20) containing methane at a pressure of approximately 69 atmospheres, a Raman cell (30) which is substantially transparent at both 1064 and 1540 nanometers, a collimating lens (33) which is substantially transparent at both 1064 and 1542 nanometers, a medium (18) which is nearly one hundred percent reflective at 1064 nanometers and less than twelve percent reflective at 1542 nanometers wherein the first surface ($S_1$) and the medium of (18) form a resonant cavity for the lasing medium of (3) and wherein the Raman cell of (20) (1) absorbs laser photon at 1064 nanometers when the laser photon intensity exceeds a threshold, thus substantially depleting the photon population which spoils the Q of the resonant cavity and (2) emits Raman-shifted photons at 1542 nanometers which pass through the medium of (18).

9. A method of spoiling the Q of a laser cavity using a Raman medium, comprising the step of:

maintaining the Raman medium within the cavity during lasing, the Raman medium acting to spoil the Q when laser photon intensity is sufficiently large to induce stimulated Raman emission.

10. A method of producing a shift in frequency of laser light, comprising the following steps:

establishing an increasing population of laser photons in an optical cavity, while passing the photons through a Raman medium contained within the cavity; when stimulated Raman emission occurs, altering the Q of the cavity to diminish resonance and promote transmission of light from the cavity.

* * * * *